US012121916B2

(12) United States Patent
Hodossy et al.

(10) Patent No.: US 12,121,916 B2
(45) Date of Patent: Oct. 22, 2024

(54) PUMP ASSEMBLY WITH SHIELD

(71) Applicant: Essity Hygiene and Health Aktiebolag, Gothenburg (SE)

(72) Inventors: Sofia Hodossy, Gothenburg (SE); Hugo Nilsson, Ljungby (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

(21) Appl. No.: 18/551,437

(22) PCT Filed: Mar. 29, 2021

(86) PCT No.: PCT/EP2021/058202

§ 371 (c)(1),
(2) Date: Sep. 20, 2023

(87) PCT Pub. No.: WO2022/207072

PCT Pub. Date: Oct. 6, 2022

(65) Prior Publication Data

US 2024/0033755 A1 Feb. 1, 2024

(51) Int. Cl.
*B05B 1/28* (2006.01)
*A47K 5/12* (2006.01)
(Continued)

(52) U.S. Cl.
CPC .................. *B05B 1/28* (2013.01); *A47K 5/12* (2013.01); *B05B 11/1029* (2023.01);
(Continued)

(58) Field of Classification Search
CPC ... B05B 1/28; B05B 11/1077; B05B 11/1029; A47K 5/12; A47K 5/1207; F09B 9/14
(Continued)

(56) References Cited

U.S. PATENT DOCUMENTS 3,032,803 A 5/1962 John
3,306,252 A 2/1967 Knight et al.
(Continued)

FOREIGN PATENT DOCUMENTS

CA 2035124 A1 7/1992
CN 107105946 A 8/2017
(Continued)

OTHER PUBLICATIONS

International Preliminary Report on Patentability for International Application No. PCT/EP2021/058202; International Filing Date: Apr. 8, 2021; dated Jun. 16, 2023; 28 pages.
(Continued)

*Primary Examiner* — Bob Zadeh
(74) *Attorney, Agent, or Firm* — CANTOR COLBURN LLP

(57) ABSTRACT

Disclosed is a pump assembly having slidingly engaged upper and lower sleeves, and a pump having inlet and outlet ends and a pump chamber therebetween. Movement of the lower sleeve towards the upper sleeve causes the pump chamber to reduce in volume. The outlet end of the pump has a shoulder between a first diameter portion and an outlet nozzle extending downwardly from the shoulder and having a second diameter smaller than the first diameter portion. The lower end of the lower sleeve includes a shied extending from a lowermost rim upwards and inwards to terminate at an orifice that is larger than the second diameter but smaller than the first diameter portion. The shoulder supporting against a lip of the orifice and the outlet nozzle extending through the orifice to terminate at a dispersion location within the shield at a distance L from the orifice.

20 Claims, 6 Drawing Sheets

(51) Int. Cl.
*B05B 11/10* (2023.01)
*F04B 9/14* (2006.01)

(52) U.S. Cl.
CPC ........ *B05B 11/1077* (2023.01); *A47K 5/1207* (2013.01); *F04B 9/14* (2013.01)

(58) Field of Classification Search
USPC ............. 222/214, 181.1, 181.2, 181.3, 185.1
See application file for complete search history.

(56) References Cited

U.S. PATENT DOCUMENTS

| | | | | |
|---|---|---|---|---|
| 3,744,678 | A | 7/1973 | Beres et al. | |
| 3,865,283 | A | 2/1975 | Hayes | |
| 3,887,115 | A | 6/1975 | Petterson | |
| 3,936,000 | A | 2/1976 | Weyn | |
| 4,087,022 | A | 5/1978 | Zanetti-Streccia | |
| 4,165,836 | A | 8/1979 | Eull | |
| 4,181,261 | A | 1/1980 | Crum | |
| 4,420,099 | A | 12/1983 | Pizzurro et al. | |
| 4,701,167 | A | 10/1987 | Chekan | |
| 5,221,027 | A | 6/1993 | Gibilsco | |
| 5,323,963 | A | 6/1994 | Ballu | |
| 6,082,586 | A | 7/2000 | Banks | |
| 6,607,103 | B2 | 8/2003 | Gerenraich et al. | |
| 6,702,198 | B2 | 3/2004 | Tam et al. | |
| 7,128,283 | B1 | 10/2006 | Shahin | |
| 7,850,049 | B2 * | 12/2010 | Ciavarella | A47K 5/14 222/190 |
| 7,942,146 | B2 | 5/2011 | Boeck | |
| 8,365,965 | B2 * | 2/2013 | Ophardt | B05B 11/1001 417/521 |
| 8,413,852 | B2 | 4/2013 | Ophardt et al. | |
| 8,479,951 | B2 | 7/2013 | Ciavarella et al. | |
| 8,485,395 | B2 * | 7/2013 | Ciavarella | A47K 5/1207 222/325 |
| 8,496,014 | B2 | 7/2013 | Bown et al. | |
| 8,555,934 | B2 | 10/2013 | Pielen et al. | |
| 8,602,263 | B2 | 12/2013 | Baron et al. | |
| 8,783,510 | B2 | 7/2014 | Reynolds et al. | |
| 8,807,398 | B2 * | 8/2014 | Sundberg | A47K 5/12 222/190 |
| 9,314,804 | B1 | 4/2016 | Harrower et al. | |
| 10,376,917 | B2 | 8/2019 | Rospierski | |
| 10,485,384 | B2 | 11/2019 | Kurchev et al. | |
| 10,702,876 | B2 | 7/2020 | Slutskii et al. | |
| 11,045,052 | B2 | 6/2021 | Miedzius | |
| 11,051,660 | B2 * | 7/2021 | Lindstrom | B05B 11/0054 |
| 2006/0081726 | A1 | 4/2006 | Gerondale | |
| 2007/0007370 | A1 | 1/2007 | Roman | |
| 2010/0059550 | A1 * | 3/2010 | Ciavarella | A47K 5/1207 222/325 |
| 2014/0203045 | A1 * | 7/2014 | Mann | A47K 5/12 222/181.3 |
| 2018/0281004 | A1 * | 10/2018 | Nilsson | B05B 11/1077 |
| 2018/0289222 | A1 * | 10/2018 | Nilsson | A47K 5/1209 |
| 2018/0318858 | A1 | 11/2018 | Maas et al. | |
| 2024/0033755 | A1 * | 2/2024 | Hodossy | A47K 5/12 |

FOREIGN PATENT DOCUMENTS

| | | | |
|---|---|---|---|
| DE | 202014005592 | U1 | 10/2015 |
| GB | 1390153 | A | 4/1975 |
| JP | 2005288359 | A | 10/2005 |
| TW | 201429860 | A | 8/2014 |
| WO | 2008001781 | A1 | 1/2008 |
| WO | 2009104992 | A1 | 8/2009 |
| WO | 2011133085 | A1 | 10/2011 |
| WO | 2016193251 | A1 | 12/2016 |

OTHER PUBLICATIONS

International Search Report for International Application No. PCT/EP2021/058202; International Filing Date: Mar. 29, 2021; dated Dec. 1, 2021; 3 pages.

Notification Concerning Informal Communications With the Applicant for International Application No. PCT/EP2021/058202; International Filing Date: Apr. 8, 2021; dated Mar. 6, 2023; 8 pages.

Written Opinion for International Application No. PCT/EP2021/058202; International Filing Date: Mar. 29, 2021; dated Dec. 1, 2021; 7 pages.

Chinese Application No. 202180094541.3; Office Action dated Jan. 24, 2024 with English translation; 11 pages.

* cited by examiner

PUMP ASSEMBLY WITH SHIELD

CROSS REFERENCE TO RELATED APPLICATIONS

This application is a National Stage Application of PCT/EP2021/058202, filed Mar. 29, 2021, which is incorporated by reference in its entirety herein.

TECHNICAL FIELD

The present disclosure relates to fluid dispensers and in particular to a pump assembly for dispensing a fluid from a fluid container comprising a shield for narrowing a spray angle of fluid exiting an outlet of the pump assembly.

BACKGROUND

Fluid dispensers of various types are known, such as for dispensing gel, foam or liquid soaps and alcohol sanitizers. The fluid dispensers may have an integral pump or a pump as part of a disposable and replaceable fluid container. The pump may be actuated to dispense fluid from a fluid container within the dispenser. Such pumps may be manually or automatically actuated to dispense the fluid by a pressing force or by a sensor sensing the presence of a hand.

Commercial liquid dispensers frequently use inverted disposable containers that can be placed in more permanent, dispensing devices. The dispensers may be affixed to walls of washrooms or the like. The devices are often located in washrooms or at the entrances to public buildings. Having the pump being integral to the disposable container as part of a disposable fluid dispensing package is desirable as it makes refilling the dispenser more convenient. It nevertheless requires the pump to be simple and cheap with a minimum of disposable parts.

Fluid dispensers are generally affixed to a wall or support structure, providing greater freedom in the direction and amount of force that is required for actuation. By the device being supported by an additional structure, they do not require two points of contact by the user for actuation. Thereby the points of contact by the user are reduced to 1, or even zero when such devices use sensors. Sensor activation may identify the presence of a user's hand beneath the outlet to activate the pump. This avoids user contact with the device and the associated cross-contamination. It also prevents incorrect operation that can lead to damage and premature ageing of the dispensing mechanism. Alternatively, the user may manually actuate the pump by a pressing force imparted by a hand that may be subsequently washed with the dispensed fluid thereby reducing contamination during operation.

Various pumps are known that are suitable for the purpose of fluid dispensing. For example, in WO 2017050390, a pump is shown based on a plastomer spring and pump chamber. The pump is actuated by compressing the pump chamber between two concentric sleeves. The pump is received within a dispenser that interacts with the sleeves to actuate the pump. The pump has an outlet in the form of an orifice that delivers the product to a user. For certain viscous materials, such as soaps, the orifice provides adequate delivery.

A problem associated with pumps existing in the art is that the product is not always dispensed in a single defined direction. Caking of the nozzle may occur with certain products, leading to partial blockage and delivery in undesired directions. This is particular the case for alcohol sanitizers and alcogels, having a volatile fraction that may evaporate. Spray from the orifice or nozzle can accumulate on adjacent surfaces of the dispenser. The user may also be affected by spray unexpectedly landing on their clothing or other body parts including in the eyes. This can cause increased service time in an area where the pump is installed, e.g. washroom area, if the pump spray need be cleaned off other surfaces.

Attempts have been made to improve the delivery by providing a nozzle having a greater axial extent in order to ensure a more focused delivery. Nevertheless, increasing the length of the nozzle with respect to the neighbouring parts of the dispenser can increase the exposure to spray in a lateral direction. An additional factor that needs to be taken into account for pumps of the type having a compressible or collapsible pump chamber is that the outlet orifice or nozzle should be securely retained during actuation. Any tendency of the outlet portion to twist or deviate during distortion of the pumping chamber could exacerbate problems of spaying and inaccurate delivery. This is particularly important in the case of plastomer based pumps, where the force required for delivery may be relatively high.

SUMMARY

It would be desirable to have a pump assembly that provides for focused delivery of a sanitizing fluid or the like and that reduces the incidence of stray droplets. The pump assembly should advantageously be hygienic, simple to manufacture, maintain and assemble and/or economical to produce. It should also preferably be robust for commercial usage.

The disclosure relates to a pump assembly and method according to the accompanying independent and dependent claims. Combinations of features from the dependent claims and independent claims may be combined with features as appropriate and not merely as explicitly set out in the claims.

In a particular aspect, a pump assembly is disclosed for dispensing a fluid from a fluid container. The pump assembly is of the type comprising an upper sleeve and a lower sleeve, slidingly engaged together and a pump having an inlet end, an outlet end and a pump chamber therebetween, the pump being retained within the sleeves with the inlet end located at an upper end of the upper sleeve and the outlet end located at a lower end of the lower sleeve, whereby movement of the lower sleeve towards the upper sleeve causes the pump chamber to reduce in volume. The outlet end of the pump has a shoulder between a first diameter portion and an outlet nozzle, the outlet nozzle extending downwardly from the shoulder and having a second diameter smaller than the first diameter portion. The lower end of the lower sleeve comprises a shield, extending from a lowermost rim upwards and inwards to terminate at an orifice, the orifice being larger than the second diameter but smaller than the first diameter portion and the shield forming a domed continuous surface. The shoulder can thus support against a lip of the orifice and the outlet nozzle extends through the orifice to terminate at a dispersion location within the shield at a distance L from the orifice. Further, the domed continuous surface has a height of between 5 mm and 20 mm between the rim and the orifice.

The nozzle ensures a focused delivery of the fluid. In the present context, fluid is intended to encompass, liquids, gels, dispersions, emulsions, foams and any other form of composition that may be delivered by pumps of this type. Nevertheless, the further that the nozzle extends from the lower sleeve, the greater is its exposure and the more likely that droplets may stray in undesired directions. According to the claimed embodiment, by providing the shield around the nozzle, lateral spraying can be prevented.

The orifice marks the point at which the lower end of the lower sleeve engages with the outlet end of the pump. This is the point at which force is transmitted to the pump in order to cause collapse of the pumping chamber. By providing a domed surface to the shield, force can better be transmitted through the lower shield to the outlet end of the pump. Furthermore, the continuous nature of the surface ensures that any spray is kept within the shield and can be easily cleaned. In this context, continuous surface means that it does not have any openings through which liquid or droplets might penetrate. Preferably, the domed surface is continuous and hermetic from the rim to the orifice.

The shield may have any domed shape that ensures good force transmission between the rim and the point of engagement with the shoulder of the outlet end of the pump. It may be hemispherical or part spherical, vaulted, arched or part ovoid. In an embodiment, it may be described as paraboloid. The skilled person will understand that this does not mean that it need have a mathematically perfect parabolic shape but merely that it is smooth and structurally able to transmit the required force with a minimum of structural thickness. In certain embodiments, the shield may have a wall thickness of between 0.8 mm and 1.6 mm, preferably between 1 mm and 1.3 mm and optionally no thicker than the wall thickness of the lower sleeve. Providing the shield to have a similar thickness to the remainder of the lower sleeve is advantageous in manufacturing, since parts having a homogenous thickness distribution are more stable to manufacture using certain techniques such as injection moulding and the like.

In an embodiment, the shield has a diameter at the rim in the range 10 mm to 25 mm, optionally between 15 mm and 20 mm. Further, the domed continuous surface has a height of between 5 mm and 20 mm between the rim and the orifice, optionally between 8 mm and 12 mm. As will be understood and as described further below, the relative dimensions of the shield will determine the manner in which it limits spray in directions other than the desired direction.

The effectiveness of the shield will also depend on the position of the dispersion location, which is also dependent upon the length of the nozzle. In one embodiment, the nozzle has a length of between 2 mm and 10 mm as measured from the shoulder. This may preferably be between 3 mm and 6 mm. The length of the nozzle is given here as the external dimension as measured from the connection to the shoulder. It will be understood that the nozzle will protrude a lesser distance towards the dispersion location, since the shoulder rests against the lip of the orifice at a rear side of the shield. It will also be understood that for the fluid exiting the nozzle, the effective nozzle length will depend upon the length of the internal channel, which may be different to the external length of the nozzle. The distance L may be in the range from 2 mm to 6 mm, optionally between 3 mm and 5 mm. Seen in a different perspective, the nozzle is recessed within the shield and set back from the lowermost rim. The dispersion location may be set back a distance of from 3 mm to 15 mm from the rim, preferably from 6 mm to 10 mm.

In an embodiment, the orifice may have a diameter in the range from 3 mm to 10 mm, optionally between 6 mm and 8 mm. Here too, the size of the orifice will depend upon the outer diameter of the nozzle, particularly at its base. It will also be understood that the diameter of the nozzle may vary along its length, in particular, it may taper towards the dispersion location. The retention of the nozzle within the orifice will be important in ensuring a stable retention of the pump, especially during compression. The shoulder at the outlet end of the pump may be smooth but may also be provided with a step or seat to better locate in the orifice. In an embodiment, the lower sleeve engages with the pump only at the lip of the orifice and does not extend towards the inlet end of the pump or otherwise surround the outlet end of the pump.

As a result of the above defined geometrical relations of the shield and nozzle, a limited spray angle may be achieved. In the present context, the spray angle may be defined as the angle between a line from a centre of the dispersion location to the rim and an axis of the nozzle. This spray angle is preferably between 20 degrees and 70 degrees, preferably between 35 degrees and 55 degrees. The skilled person will understand that this is defined as around half of the overall angle over which spray can be encountered. The actual overall angle will be slightly greater than twice the spray angle, since the dispersion location has a finite diameter and droplets can deflect from an opposite edge of the dispersion location and even from caked product extending beyond the nozzle. It will also be understood that it is not the purpose of the disclosure to provide a uniform delivery within this conical boundary, which merely represents the maximum extent to which droplets can stray.

Reference here is given to the axis of the nozzle. In general, this will also be the axis of the pump and also of the upper and lower sleeves, all of which are concentric. It is however not a requirement that this is the case and also not a requirement that the shield is concentric or fully symmetrical with other items. The purpose of the shield is to transmit force to the pump and avoid unwanted spray in certain directions. The shield may therefore orient more in one direction than in another direction and the lowermost rim need not necessarily be perpendicular to the respective axes of the pump and the nozzle.

According to an embodiment the lower sleeve is slideably retained together with the upper sleeve by interacting guide elements. The guide may comprise a snap-on resilient connecting part such as a tongue and groove arrangement or a detent, engageable with a channel. Such a connection allows for simple assembly of the sleeves, while retaining them in concentric arrangement, preventing the lower sleeve from disengaging under gravity or other forces occurring during its lifetime.

In an embodiment, the lower sleeve may also be rotatable with respect to the upper sleeve in the uncompressed, extended position. This may allow the lower sleeve to be rotated to a locked position in which the pump cannot be compressed, thereby preventing accidental actuation of the pump. This may be used during initial storage and transport of the pump prior to use.

According to an embodiment the sleeves are made from one or more plastic materials of the following list: PP (polypropylene), PET (polyethylene terephthalate), PE (polyethylene), PVC (polyvinyl chloride), PA (polyamide), PC (polycarbonate), POM (polyoxymethylene), ABS (acrylonitrile butadiene styrene) or PS (polystyrene). A preferred material for both sleeves is HDPE although it will be understood that they do not need to be both manufactured of the same material.

In a preferred embodiment, the lower sleeve surrounds the upper sleeve. This is the configuration corresponding to presently used pumps of this type and allows pumps according to the present disclosure to be used in existing dispensers. In such case the lower, outer sleeve may be provided with a flange at its upper end for actuation in an upwards direction. The skilled person will understand that this configuration, as further detailed below, can be easily reversed with the upper sleeve outermost.

In a further embodiment, a diameter of the lower sleeve is greater than a diameter of the rim of the shield, preferably between 20 mm and 50 mm, optionally between 25 mm and 35 mm. There is thus a narrowing of the lower sleeve, which may taper towards the rim. In this context, the diameter of the lower sleeve is used to refer to the constant diameter portion of the sleeve which is in sliding relation to the upper sleeve. Clearly, there may be parts of this element that extend further outwardly, such as the actuating flange mentioned above.

According to an embodiment the lower sleeve has a length in the range 20-60 mm, optionally between 40 mm and 50 mm. The thickness of the lower sleeve may be in the range 0.5 mm to 3 mm, optionally around 1.1 mm to 1.3 mm.

In a particular embodiment, the pump comprises a plastomer spring located within the pump chamber. Such pumps have been found extremely versatile in terms of minimising production costs by minimising the number of components. The pump chamber may also be collapsible, preferably of plastomer material. The pump chamber and spring may together provide inlet and outlet valves, whereby a pump is formed of just two pump components.

According to one embodiment the lower sleeve is a monolithic structure, in other words, the shield and the lower sleeve are a single element. Preferably this is a single injection moulded component. The upper sleeve may also be a single component, whereby the whole pump may be formed of just four elements, reducing production complexity and assembly operations.

The disclosure also relates to a disposable fluid dispensing package, comprising a pump assembly as described above and hereinafter, sealingly connected to a collapsible product container. The container may be permanently connected to the inlet end of the pump, e.g. by gluing or welding. Alternatively, it may be releasably connected e.g. by a snap fit, screw or bayonet connection.

The disposable fluid dispensing package may comprise a quantity of a liquid or gel product contained within the collapsible product container. In an embodiment, the package may be delivered to a user, filled and sealed and ready to be inserted into a suitable dispenser, with the pump assembly already attached. The pump assembly may itself form part of the seal or closure that prevents egress of the product prior to installation in the dispenser. In an embodiment, this seal is provided by the inlet and/or outlet valves of the pump. In this case there may be no requirement of any other removable or frangible seal, leading to a further reduction in components and potential garbage. Locking of the sleeves to prevent movement may ensure that the inlet and outlet valves cannot leak.

The disclosure also teaches a method of preventing emission of stray droplets in a fluid dispenser, the method comprising providing a pump assembly as described above and hereinafter and capturing the droplets using the shield. The domed continuous surface is then the only portion of the dispenser that needs to be cleaned to remove such droplets.

The disclosure also relates to a dispenser comprising or configured to receive such a disposable fluid dispensing package. The dispenser may be manually activated or sensor-activated to exert an axial force on the pump assembly between the upper sleeve and the lower sleeve to cause axial compression of the pump and a reduction in volume of the pump chamber In an embodiment, the dispenser may comprise a housing and an actuator, wherein the housing and/or the actuator extends downwards in use at least as far as the lowermost rim of the shield and/or no portion of the actuator or housing is within a line of sight of the dispersion location. In other words, portions of the dispenser will be hidden by the shield from droplets or spray emanating from the nozzle. The housing or actuator may then cover the shield and the rest of the pump assembly from view.

BRIEF DESCRIPTION OF THE DRAWINGS

The features and advantages of the present disclosure will be appreciated upon reference to the following drawings of a number of exemplary embodiments, in which.

DETAILED DESCRIPTION OF THE ILLUSTRATIVE EMBODIMENTS

The disclosure will be described with reference to a working position wherein the terms upper sleeve and lower sleeve are used in the context of their relative locations when in use. The lower sleeve is the sleeve at a furthest distance from the fluid container when attached to the fluid container. The lower sleeve therefore is a sliding sleeve and the upper sleeve is a stationary sleeve, relative to the dispenser when installed.

Figure 1:
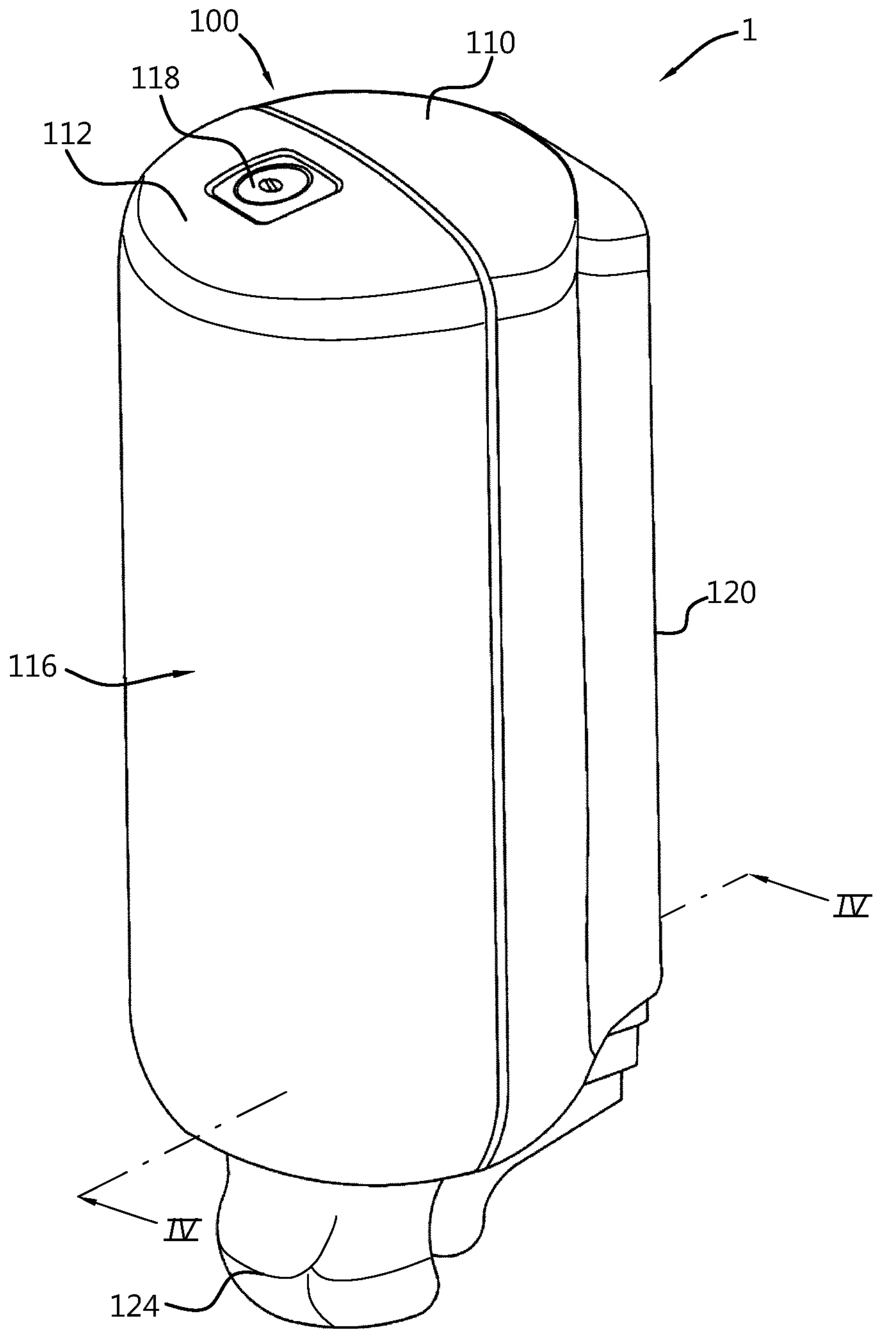
FIG. 1 shows a perspective view of an example of a dispensing system.

FIG. 1 shows a perspective view of a dispensing system 1 in which the presently disclosed pump assembly as claimed in the appended claims may be installed. The dispensing system 1 includes a reusable dispenser 100 of the type used in washrooms and the like available under the name Tork™ from Essity Hygiene and Health. The dispenser 100 is described in greater detail in WO2011/133085, the contents of which are incorporated herein by reference in their entirety. It will be understood that this embodiment is merely exemplary and illustrative, and that the current disclosure may also be implemented in other dispensing systems.

The dispenser 100 includes a rear shell 110 and a front shell 112 that engage together to form a closed housing 116 that can be secured using a lock 118. The housing 116 is affixed to a wall or other surface by a bracket portion 120. At a lower side of the housing 116 is an actuator 124, by which the dispensing system 1 may be manually operated to dispense a dose of cleaning or sanitizing fluid or the like. The operation, as will be further described below, is described in the context of a manual actuator but the disclosure is equally applicable to automatic actuation e.g. using a motor and sensor.

Figure 2:
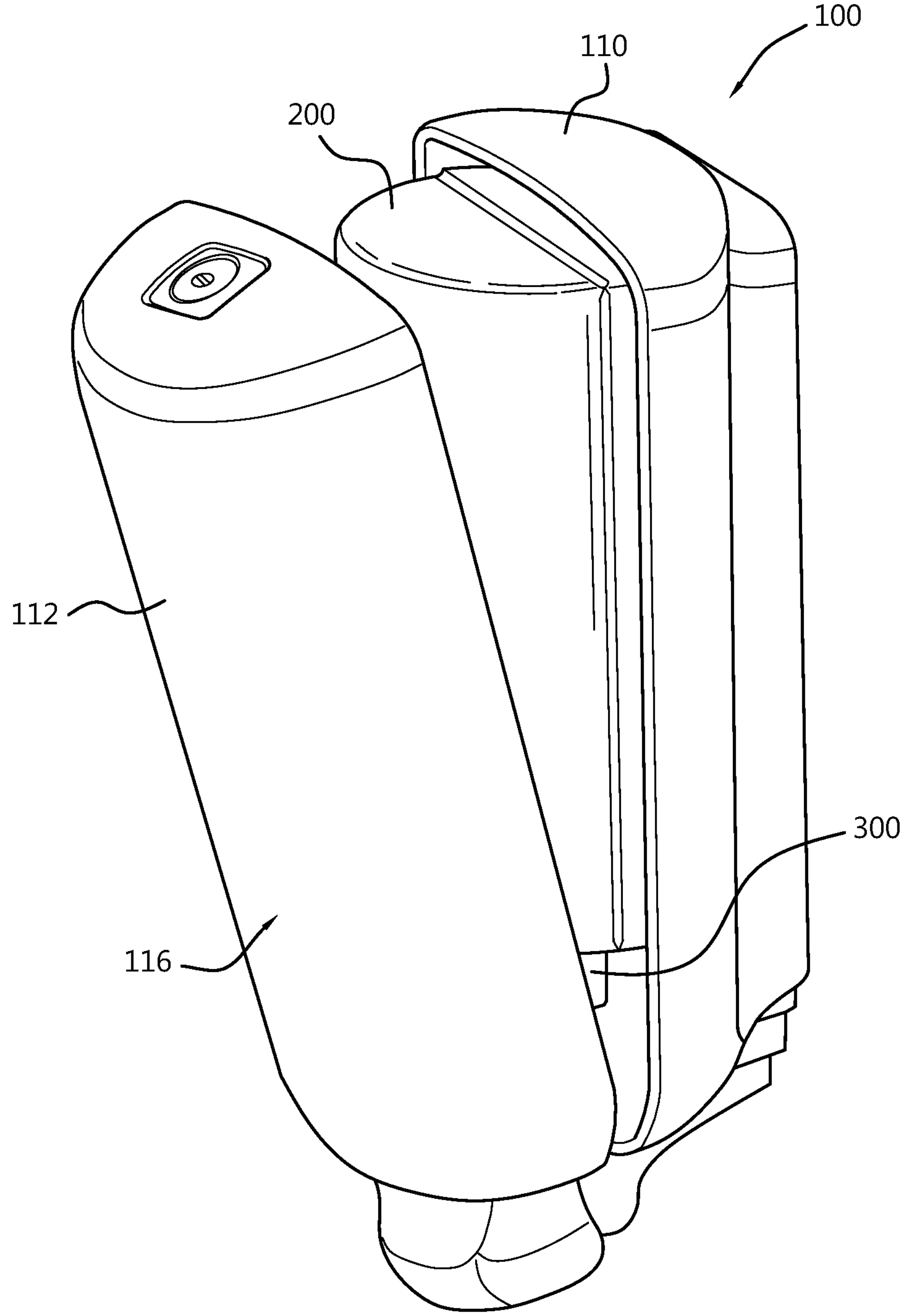
FIG. 2 shows the dispensing system of FIG. 1 in an open configuration.

FIG. 2 shows in perspective view the dispenser 100 with the housing 116 in the open configuration and with a disposable container 200 and pump assembly 300 contained therein. The container 200 is a 1000 ml collapsible container of the type described in WO2011/133085 and also in WO2009/104992, the contents of which are also incorporated herein by reference in their entirety. The container 200 is of generally cylindrical form and is made of polyethylene. The skilled person will understand that other volumes, shapes and materials are equally applicable and that the container 200 may be adapted according to the shape of the dispenser 100 and according to the fluid to be dispensed.

The pump assembly 300 has an outer configuration that corresponds substantially to that described in WO2011/133085. This allows the pump assembly 300 to be used interchangeably with existing dispensers 100. Nevertheless, the interior configuration of the pump assembly 300 may be distinct from both the pump of WO2011/133085 and that of WO2009/104992.

Figure 3:
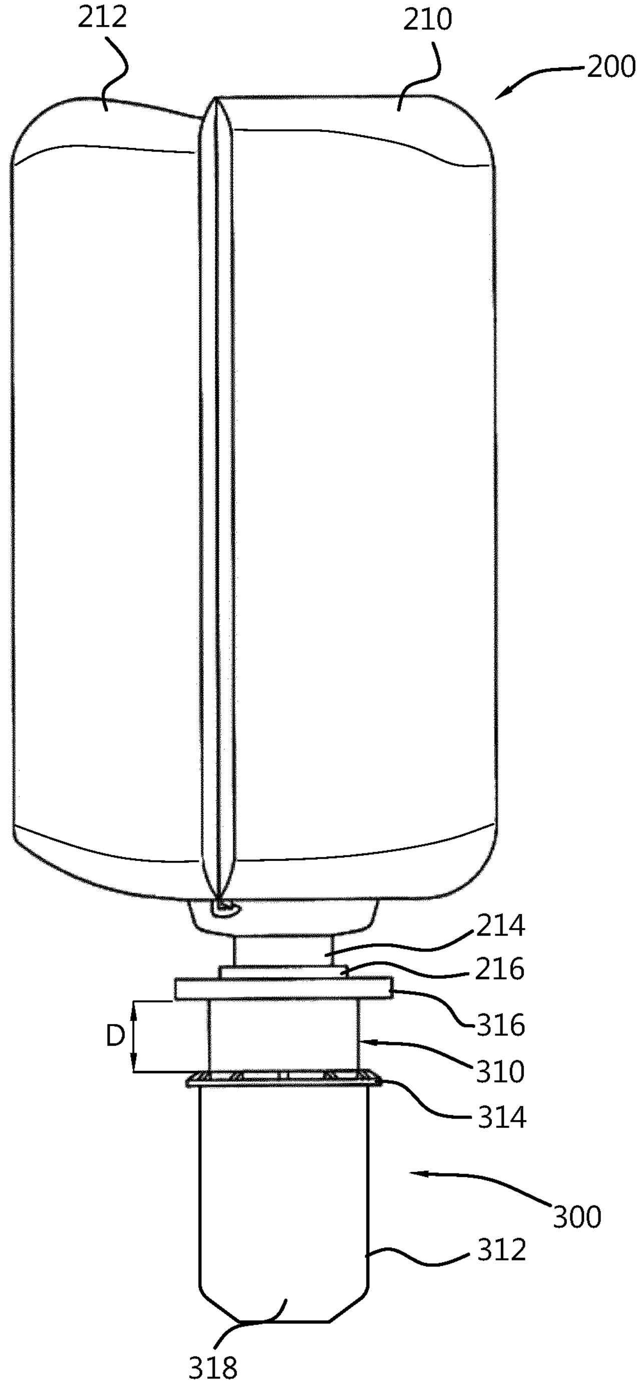
FIG. 3 shows an example of a disposable container and pump assembly in side view.

FIG. 3 shows the disposable container 200 and pump assembly 300 in side view. As can be seen, the container 200 includes two portions. A hard, rear portion 210 and a soft, front portion 212. Both portions 210, 212 are made of the same material but having different thicknesses. As the container 200 empties, the front portion 210 collapses into the rear portion as liquid is dispensed by the pump assembly 300. This construction avoids the problem with a build-up of vacuum within the container 200. The skilled person will understand that although this is an example for the form of the container, other types of reservoir may also be used in the context of the present disclosure, including but not limited to bags, pouches, cylinders and the like, both closed and opened to the atmosphere. The container may be filled with soap, detergent, disinfectant, hand sanitizer, alcohol-based sanitizer, skincare formulation, lotion, moisturizer or any other appropriate fluid and even medicaments. In most cases, the fluid will be aqueous, although the skilled person will understand that other substances may be used where appropriate, including oils, solvents, alcohols and the like. Furthermore, although reference will be made in the following to liquids, the dispenser 1 may also dispense fluids such as gels, including dispersions, suspensions or particulates.

At the lower side of the container 200, there is provided a rigid neck 214 provided with a connecting flange 216. The connecting flange 216 engages with an upper sleeve 310 of the pump assembly 300 in a snap connection. The pump assembly 300 also includes a lower sleeve 312, which terminates at lower end 318. The lower sleeve 312 carries an actuating flange 314 and the upper sleeve has an upper end with a locating flange 316. Both the sleeves 310, 312 may be injection moulded of HDPE although the skilled person will be well aware that other relatively rigid, mouldable materials may be used. In use, as will be described in further detail below, the lower sleeve 312 is displaceable by a distance D with respect to the upper sleeve 310 in order to perform a single pumping action.

Figure 4A:
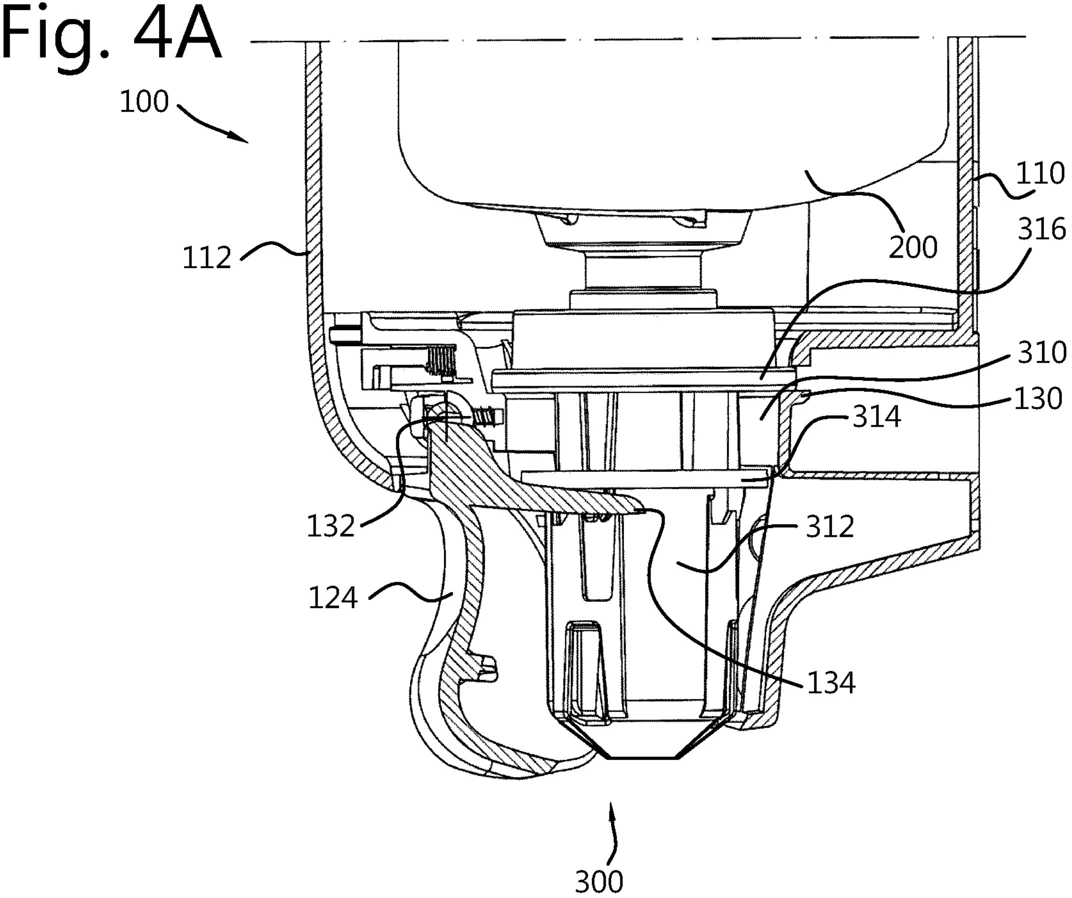
FIGS. 4A and 4B show partial cross-sectional views of the pump of FIG. 1 in operation.
Figure 4B:
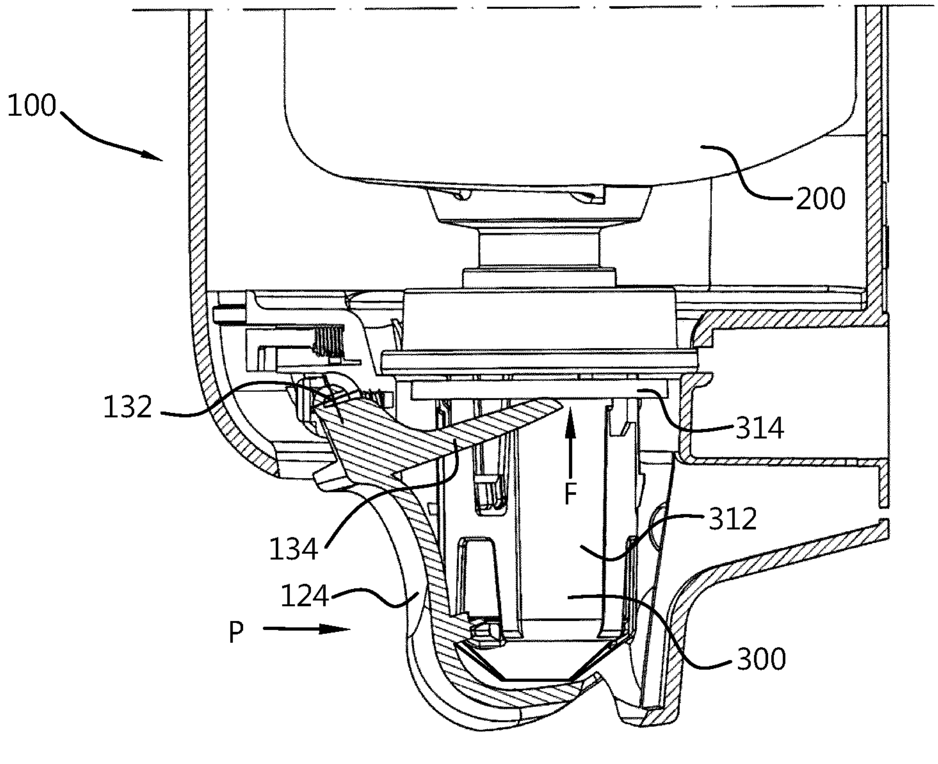

FIGS. 4A and 4B show partial cross-sectional views through the dispenser 100 of FIG. 1, illustrating the pump assembly 300 in operation. According to FIG. 4A, the locating flange 316 is engaged by a locating groove 130 on the rear shell 110. The actuator 124 is pivoted at pivot 132 to the front shell 112 and includes an engagement portion 134 that engages beneath the actuating flange 314. The pump assembly 300 including the lower sleeve 312 is out of the line of sight of an operator by being concealed by the actuator 124.

FIG. 4B shows the position of the pump assembly 300 once a user has exerted a force P on actuator 124. In this view, the actuator 124 has rotated anti-clockwise about the pivot 132, causing the engagement portion 134 to act against the actuating flange 314 with a force F, causing it to move upwards. Thus far, the dispensing system 1 and its operation is essentially the same as that of the existing system known from WO2011/133085.

Figure 5:
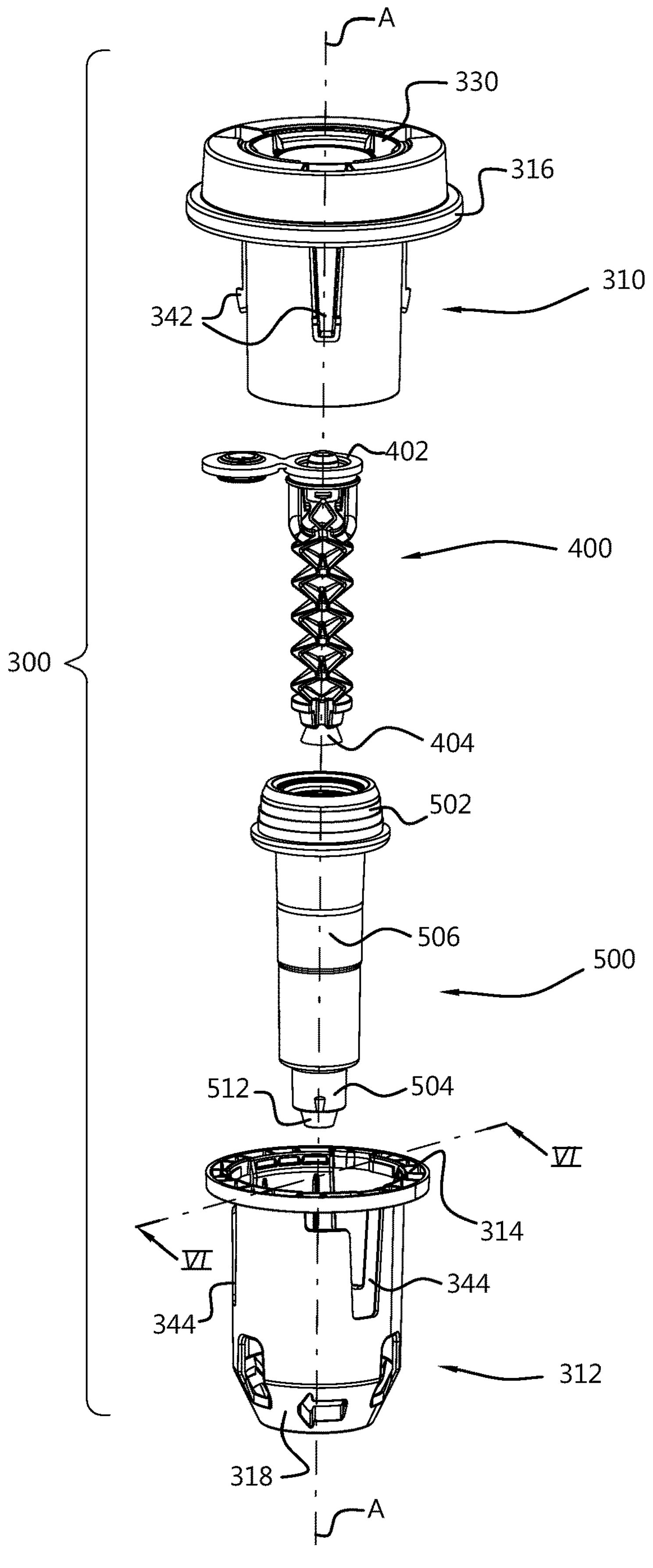
FIG. 5 shows a pump assembly in exploded perspective view.

FIG. 5 shows the pump assembly 300 in exploded perspective view illustrating the upper sleeve 310, the lower sleeve 312, spring 400 and pump body 500, all axially aligned along axis A. The pump assembly is thus formed from just four components. The spring 400 is provided with integrally formed inlet valve 402 and outlet valve 404. The pump body 500 has an inlet end 502, an outlet end 504, a pump chamber 506 and an outlet nozzle 512. The spring 400 and pump body 500 are formed of plastomer material and are generally as described in WO 2017050390, the contents of which are also incorporated herein by reference in their entirety.

The upper sleeve 310 is provided on its outer surface with three axially extending guides 342. The lower sleeve 312 is provided with three axially extending L-shaped slots 344 through its outer surface. The lower sleeve 312 is slightly larger in diameter than the upper sleeve 310 and encircles it. The axial guides 340 on the outer surface of the upper sleeve 310 are arranged to engage within respective slots 344 in the lower sleeve. The L-shape provides a locking mechanism whereby rotating the lower sleeve 312 causes the guide 342 to move into the horizontal arm of the L-shaped slot, thereby preventing axial movement of the lower sleeve 312 with respect to the upper sleeve 310. This prevents activation of the pump assembly 300 when the lower sleeve 312 is in this locked position, maintaining the pump body 500 in an uncompressed state e.g. during shipment and storage, prior to use. The guides 342 also prevent the lower sleeve 312 from being removed from its position around the upper sleeve 310 whereby the pump body 500 is retained within the sleeves 310, 312.

The pump assembly 300 can be assembled by moving all the components shown in FIG. 5 together by encompassing the spring 400 within the pump 500, and both between the upper sleeve 310 which sleeve then slides into lower sleeve 312 and is retained by engaging axial guides 342 within the slots 344 in a snap-on connection. Once connected the sleeves 310, 312 cannot easily be separated. The consequent pump assembly 300 can then be attached to a fluid container or a dispenser housing at the socket 330, details of the socket are not described in the present disclosure but may be chosen according to the housing or container with which the pump assembly 300 may be applied.

Figure 6:
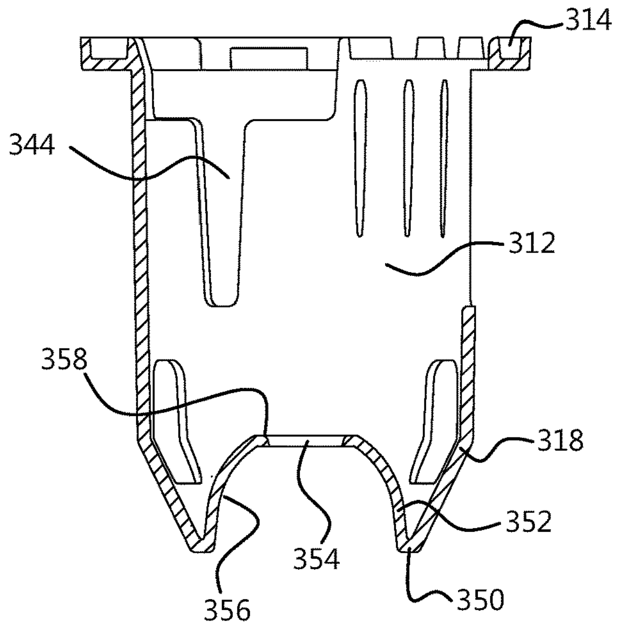
FIG. 6 shows a cutaway view the lower sleeve of FIG. 5.

FIG. 6 shows a cutaway view through the lower sleeve 312 cut along line VI-VI of FIG. 5. The actuating flange 314 extends outwards from the lower sleeve body at the upper part. The L-shaped slots 344 are clearly shown.

In this view, it can be seen that the lower end 318 of the outer sleeve 312 terminates at a lowermost rim 350. The rim 350 is annular and continuous and marks the beginning of a shield 352 that extends upwards and inwards to terminate at an orifice 354 having a lip 358. The shield 352 between the rim 350 and the orifice 354 forms a domed continuous surface 356 of generally paraboloid shape.

Figure 7:
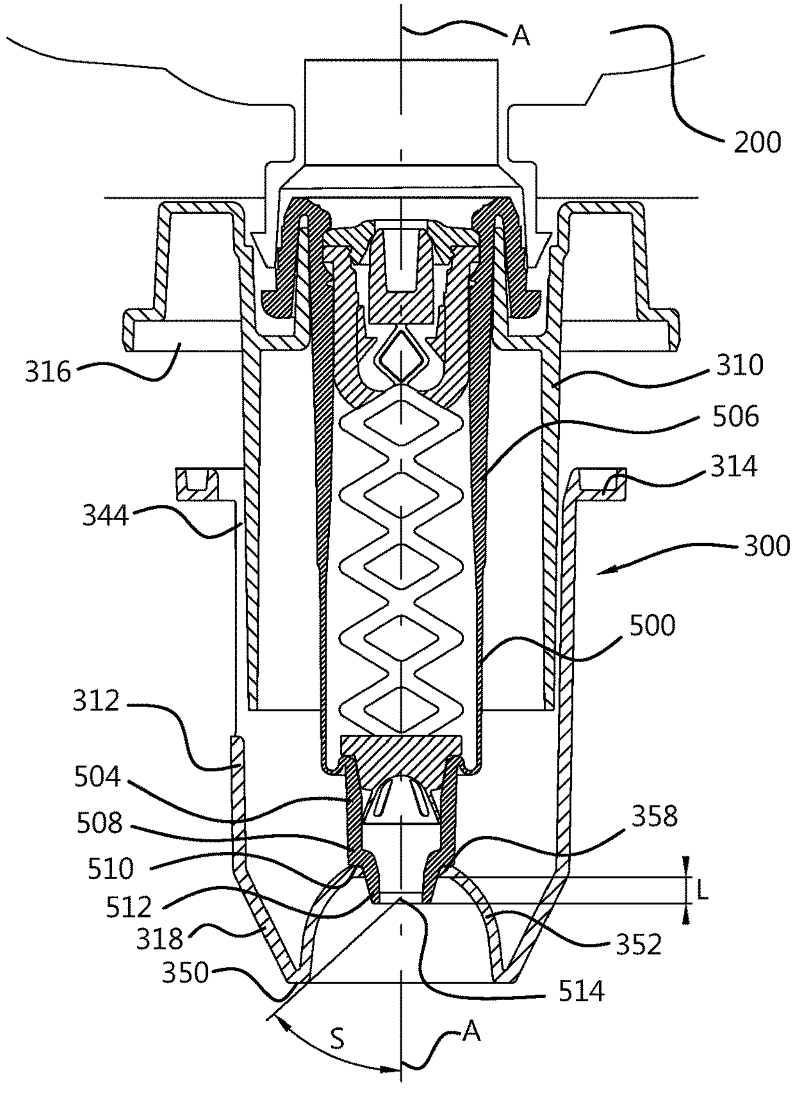
FIG. 7 shows a cross section view of the assembled pump assembly of FIG. 5.

FIG. 7 shows a cross section through the pump assembly 300 of FIG. 5 in its assembled state.

The pump 500 is located within the upper sleeve 310. The lower sleeve 312 encircles the upper sleeve 310. The actuating flange 314 extends outwardly and can abut the locating flange 316 when the pump chamber 506 is maximally compressed. The outlet end 504 of the pump 500 has a first diameter portion 508, which forms a shoulder 510 extending inwards to the nozzle 512, which has a smaller diameter than the first diameter portion 508. The nozzle 512 extends downwards from the shoulder 510.

As can be seen, the nozzle 512 protrudes through the orifice 354 of the shield 352 and extends downwards to end at a dispersion location 514. This is the point at which a fluid, in use, will exit the nozzle 512 and no longer be thereby constrained. It is located at a distance L from the orifice 354. The orifice 354 is larger than the nozzle 512 but smaller than the first diameter portion 508 so that the shoulder 510 can support stably against the lip 358.

As can also be seen in this view, the nozzle 512 is recessed within the shield 352 and set back from the lowermost rim 350. The position of the dispersion location 514 is such that a line drawn from a centre of the dispersion location 514 to the rim 350 forms an angle S with the axis of the nozzle. This is referred to here as the spray angle. In the illustrated embodiment, the length of the nozzle 512 is approximately 5 mm and its internal diameter at the dispersion location is around 4 mm. The distance L is around 4 mm, the shield has a diameter at the rim of around 17 mm and a depth to the orifice of around 10 mm. The spray angle S as defined above is around 45 degrees, although due to the diameter of the nozzle outlet, spray may be encountered up to around 53 degrees.

Operation of the pump assembly 300 and the dispensing system 1, will now be explained with reference to the figures, in particular, FIGS. 4*a*, 4*b* and FIG. 7.

As noted above, FIGS. 4A and 4B show how engagement of actuator 124 by a user causes the engagement portion 134 to act against the actuating flange 314 exerting a force F.

The force F causes the actuating flange 314 to lift and the lower sleeve 312 to move upwards with respect to the upper sleeve 310. This force is transmitted from the lower sleeve 312, via the lowermost rim 350 and the shield 352 to the orifice 354. The lip 358 engages against the shoulder 510, causing the outlet end 504 to move upwards together with the lower sleeve 312. The inlet end 502 of the pump body 500 is prevented from moving upwards by its engagement with the socket 330 of the upper sleeve 310.

The movement of the lower sleeve 312 with respect to the upper sleeve 310 causes an axial force to be applied to the pump body 500. This force causes the pump chamber 506 to collapse and fluid to be ejected through the nozzle 512. Reverse flow of fluid through the inlet end 502 is prevented by the inlet valve 402.

When the pump assembly 300 is in the fully compressed state on completion of an actuation stroke, the lower sleeve 312 has moved upwards a distance D with respect to the initial position and the actuating flange 314 has entered into abutment with the locating flange 316. In this position, pump chamber 506 and spring 400 have collapsed to a maximum extent.

It will be noted that although reference is given to fully compressed and collapsed conditions, this need not be the case and operation of the pump assembly 300 may take place over just a portion of the full range of movement of the respective components. The resilient nature of the plastomer pump chamber 506 and the spring 400 cause these elements to return towards their initial position by exerting a net restoring force to move the outer sleeve 312 back downwards to its initial extended position.

The force F required to collapse the pump chamber 506 is relatively high, being in practice more than 20 N. It is also not constant, due to the manner in which the pump chamber collapses. During the life cycle of a pump assembly, this fluctuating force may be repeated many times. As all of the force is to be transmitted through the shield 352 to the shoulder 510 of the pump 500, it is important that the structure is adequate to withstand it without damage. Nevertheless, excess materials are undesirable, since the pump assembly 300 is intended to be single use and may therefore be as economical as possible. The domed continuous surface 356 of the shield 352 ensures the most efficient use of materials for this structure. In the illustrated embodiment, the thickness of the shield is just 1 mm and is substantially uniform, making it better suited to injection moulding. It is also substantially the same thickness of the lower shield and is otherwise unsupported except at its connection at the lowermost rim 318.

During operation of the dispensing system 1, fluid is ejected through the nozzle 512 over the full area of the dispersion location 514. Depending on the nature of the fluid being dispensed, it may exit as a narrow-focused beam or jet, having a width similar to the internal diameter of the nozzle 512. It is however the case that certain fluids have a tendency to spread out sideways and do not form a narrow beam or jet. Additionally, any caking of the fluid around the edges of the nozzle 512 may cause deflection of parts of the fluid in a lateral direction. In a worst case, droplets and spray can be deflected by at least 90 degrees and exit in a direction perpendicular to the axis A of the nozzle 512.

As a result of the shield 352 extending forwards of the dispersion location 514, any droplets that are emitted sideways will be caught on the domed continuous surface 356. Only fluid and droplets that depart from the nozzle 512 within the spray angle S will exit the dispenser 100. Importantly, it should be noted that in FIG. 4*b*, the lower sleeve 312 has moved upwards with respect to the actuator 124 and the dispenser housing 116. In the absence of the shield 352, stray droplets exiting in this position at the end of the stroke D would have a tendency to collect on adjacent surfaces, especially those of the rear shell 110 and the actuator 124. By ensuring that these surfaces are not in a line of sight with any portion of the dispersion location i.e. well outside of the spray angle S, a build-up of undesirable droplets and spray can be avoided. It is noted that in the view according to FIG. 4*b*, it may appear that part of the actuator 124 passes beneath the nozzle 512 and shield 352 but the skilled person familiar with the referenced dispensers will be aware that the actuator 124 is provide with a cut-out portion at this location, allowing free passage of the dispensed fluid.

Thus, the present disclosure has been described by reference to the embodiments discussed above. Furthermore, terms for components used herein should be given a broad interpretation that also encompasses equivalent functions and features. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. The present description refers to embodiments with particular combinations of features, however, it is envisaged that further combinations and cross-combinations of compatible features between embodiments will be possible without departing from the scope of the claims.

The invention claimed is:

1. A pump assembly for dispensing a fluid from a fluid container, the pump assembly comprising:

an upper sleeve;

a lower sleeve slidingly engaged together with the upper sleeve; and a pump having an inlet end, an outlet end, and a pump chamber, wherein the pump is retained within the lower and the upper sleeves with the inlet end located at an upper end of the upper sleeve and the outlet end located at a lower end of the lower sleeve, wherein movement of the lower sleeve towards the upper sleeve from an extended position to a compressed position causes the pump chamber to reduce in volume, wherein the outlet end of the pump has a shoulder between a first diameter portion and an outlet nozzle, wherein the outlet nozzle extends downwardly from the shoulder and has a second diameter smaller than the first diameter portion, wherein the lower end of the lower sleeve comprises a shield for narrowing a spray angle of the fluid exiting the outlet end of the pump, wherein the shield extends from a lowermost rim upwards and inwards to terminate at an orifice, wherein the orifice is larger than the second diameter but smaller than the first diameter portion and the shield forming a domed continuous surface that does not have any openings through which liquid or droplets might penetrate, wherein the shoulder supports against a lip of the orifice and the outlet nozzle extends through the orifice to terminate at a dispersion location within the shield at a distance L from the orifice, and wherein the domed continuous surface has a height of between 5 mm and 20 mm between the lowermost rim and the orifice.

2. The pump assembly according to claim 1, wherein the domed continuous surface is paraboloid, with a diameter at the lowermost rim in the range 10 mm to 25 mm.

3. The pump assembly according to claim 1, wherein the domed continuous surface has a height of between 8 mm and 12 mm between the lowermost rim and the orifice.

4. The pump assembly according to claim 1, wherein the outlet nozzle has a length of between 2 mm and 10 mm from the shoulder.

5. The pump assembly according to claim 1, wherein the orifice has a diameter in the range from 3 mm to 10 mm.

6. The pump assembly according to claim 1, wherein the shield has a wall thickness of between 0.8 mm and 1.6 mm.

7. The pump assembly of claim 1, wherein a spray angle S defined between a line from a centre of the dispersion location to the lowermost rim and an axis of the outlet nozzle is between 20 degrees and 70 degrees.

8. The pump assembly according to claim 1, wherein the lower sleeve is retained to the upper sleeve by a snap-on connection.

9. The pump assembly of claim 1, wherein the lower sleeve is rotatable with respect to the upper sleeve in the extended position to prevent actuation of the pump.

10. The pump assembly of claim 1, wherein the sleeves are made from one or more plastic materials of the following list: PP, PET, PE, PVC, PA, POM, ABS, PC, PS, and HDPE.

11. The pump assembly of claim 1, wherein an overlapping portion of the lower sleeve surrounds the upper sleeve.

12. The pump assembly of claim 1, wherein a diameter of the lower sleeve is greater than a diameter of the lowermost rim of the shield.

13. The A pump assembly of claim 1, wherein the lower sleeve comprises a monolithic structure.

14. The pump assembly of claim 1, wherein the pump comprises a plastomer spring located within the pump chamber.

15. The pump assembly of claim 1, wherein the pump chamber is collapsible.

16. A disposable fluid dispensing package, comprising a pump assembly according to claim 1, sealingly connected to a collapsible product container.

17. The disposable fluid dispensing package of claim 16, comprising a quantity of a liquid or gel product contained within the collapsible product container.

18. A dispenser comprising the disposable fluid dispensing package of claim 16.

19. The dispenser according to claim 18, comprising a housing and an actuator, wherein the housing and/or the actuator extends downwards in use at least as far as the lowermost rim of the shield and/or no portion of the actuator or housing is within a line of sight of the dispersion location.

20. A method of preventing emission of stray droplets in a fluid dispenser, the method comprising providing a pump assembly according to claim 1, and capturing the droplets using the shield.

* * * * *